US009215947B2

(12) United States Patent
Sonderegger et al.

(10) Patent No.: US 9,215,947 B2
(45) Date of Patent: Dec. 22, 2015

(54) BREWING APPARATUS WITH EXTRACTION FROM A PORTION CAPSULE AND METHOD OF OPERATING SAME

(71) Applicant: EUGSTER/FRISMAG AG, Amriswil (CH)

(72) Inventors: Remo Sonderegger, Tagerwilen (CH); Daniel Fischer, Romanshorn (CH)

(73) Assignee: Eugster/Frismag AG Elektrohaushaltgerate, Amriswil (CH)

( * ) Notice: Subject to any disclaimer, the term of this patent is extended or adjusted under 35 U.S.C. 154(b) by 0 days.

(21) Appl. No.: 14/394,156

(22) PCT Filed: Mar. 21, 2013

(86) PCT No.: PCT/EP2013/055990
§ 371 (c)(1),
(2) Date: Oct. 13, 2014

(87) PCT Pub. No.: WO2013/143974
PCT Pub. Date: Oct. 3, 2013

(65) Prior Publication Data
US 2015/0044342 A1 Feb. 12, 2015

(30) Foreign Application Priority Data
Mar. 30, 2012 (DE) .......................... 10 2012 006 414

(51) Int. Cl.
*A47J 31/40* (2006.01)
*A23F 5/26* (2006.01)
*A47J 31/06* (2006.01)
*A47J 31/36* (2006.01)

(52) U.S. Cl.
CPC ............... *A47J 31/407* (2013.01); *A23F 5/262* (2013.01); *A47J 31/0668* (2013.01);
(Continued)

(58) Field of Classification Search
CPC .............. A47J 31/0668; A47J 31/0678; A47J 31/0673; A47J 31/3695; A47J 31/407; A47J 31/3623; A47J 31/3628; A47J 31/3638; A23F 5/262
See application file for complete search history.

(56) References Cited

U.S. PATENT DOCUMENTS 6,606,938 B2 * 8/2003 Taylor ............................ 99/295
2003/0066431 A1 * 4/2003 Fanzutti et al. ................. 99/279
(Continued)

FOREIGN PATENT DOCUMENTS

DE 602004007524 T2 3/2008
DE 102010044945 A1 12/2011
(Continued)

OTHER PUBLICATIONS

Translation of PCT International Preliminary Report on Patentability, Oct. 2, 2014, 6 pages.

*Primary Examiner* — Anthony Weier
(74) *Attorney, Agent, or Firm* — McNees Wallace & Nurick LLC

(57) ABSTRACT

The present invention relates to a brewing apparatus for brewing by extraction from a portion capsule, having a first brewing-chamber element and a second brewing-chamber element, wherein the first brewing-chamber element can be moved between a loading position, in which the first and the second brewing-chamber elements are spaced apart from one another in order for the portion capsule to be introduced, and an extraction position, in which the first and the second brewing-chamber elements have been advanced towards one another in order to form a substantially closed brewing chamber for the portion capsule, wherein the brewing apparatus is designed such that the orientation of the portion capsule remains substantially constant as it is transferred from the loading position into the extraction position.

8 Claims, 5 Drawing Sheets

(52) U.S. Cl.
CPC ......... *A47J 31/0673* (2013.01); *A47J 31/0678* (2013.01); *A47J 31/3623* (2013.01); *A47J 31/3628* (2013.01); *A47J 31/3638* (2013.01); *A47J 31/3695* (2013.01)

(56) References Cited

U.S. PATENT DOCUMENTS

2006/0174769 A1 * 8/2006 Favre et al. ...................... 99/275
2010/0064899 A1 * 3/2010 Aardenburg .................... 99/295

FOREIGN PATENT DOCUMENTS

| DE | 102011011204 A1 | 12/2011 |
| EP | 1502529 A1 | 2/2005 |
| EP | 2077087 A1 | 7/2009 |
| EP | 2229082 A1 | 9/2010 |
| EP | 2484252 A1 | 8/2012 |
| WO | 9517121 A1 | 6/1995 |

* cited by examiner

BREWING APPARATUS WITH EXTRACTION FROM A PORTION CAPSULE AND METHOD OF OPERATING SAME

PRIOR ART

The present invention relates to a brewing device for extracting from a portion capsule, having a first brewing chamber element and a second brewing chamber element, wherein the first brewing chamber element is movable between a loading position, in which the first and the second brewing chamber element are spaced apart from one another, and an extraction position, in which the first and the second brewing chamber element have been moved together in order to form a substantially closed brewing chamber.

Such brewing devices are well known. For example, the document EP 2 077 087 A1 discloses a brewing device for a portion capsule, said brewing device comprising a second brewing chamber element in the form of a receiving element having a cavity for receiving the portion capsule, and a first brewing chamber element in the form of a closure element for closing the cavity. The closure element in this case comprises an injection arrangement in order to introduce extraction liquid into the portion capsule, while the receiving element comprises an extraction arrangement in order to discharge the extraction liquid that interacts with a beverage substance arranged in the portion capsule out of the portion capsule and to supply it to a drinking vessel in order to prepare a beverage. In order to fill the brewing device with the portion capsule, the closure element is transferred into a loading position in which it is spaced apart from the receiving element. Subsequently, the portion capsule is introduced into an intermediate space between the receiving element and the closure element and then the closure element is moved in an axial direction in the direction of the receiving element, with the result that the portion capsule is introduced into the cavity in the receiving element. In the extraction position, the receiving element and the closure element form a substantially closed brewing chamber for extracting from the portion capsule. The beverage substance comprises in particular roasted coffee or instant coffee to be extracted. It is furthermore known to equip such brewing devices with perforation means which perforate the portion capsule in order to introduce the extraction liquid or to discharge the beverage extract during or after the closing of the brewing chamber.

A disadvantage of such brewing devices is that there is the risk that the portion capsule will butt against the second brewing chamber element while the first brewing chamber element is being transferred from the loading position in the direction of the extraction position, and will not be able to be introduced into the receptacle. In this case, closing of the brewing chamber is blocked and proper functioning of the brewing device is prevented. If the user then applies increased force in order to bring about closing of the brewing chamber in spite of the resistance, there is the additional risk that the brewing chamber or the closure mechanism of the brewing device will be damaged.

Therefore, the invention is based on the object of providing a brewing device for extracting from a portion capsule, said brewing device not having the disadvantages of the prior art and allowing comparatively reliable and error-free closing of the brewing chamber compared with the prior art.

DISCLOSURE OF THE INVENTION

This object is achieved according to the invention by a brewing device for extracting from a portion capsule, having a first brewing chamber element and a second brewing chamber element, wherein the first brewing chamber element is movable between a loading position, in which the first and the second brewing chamber element are spaced apart from one another in order to introduce the portion capsule, and an extraction position, in which the first and the second brewing chamber element have been moved together in order to form a substantially closed brewing chamber for the portion capsule, and wherein the brewing device is configured such that the orientation of the portion capsule remains substantially constant during transfer from the loading position into the extraction position.

Advantageously, in this way it is not necessary to orient the portion capsule during transfer from the loading position into the extraction position, and so the risk of the brewing device being blocked on account of defective orientation or orientation that has not occurred at all is eliminated. In particular, the portion capsule is moved translationally merely in the axial direction while the first brewing chamber element is being transferred from the loading position into the extraction position.

According to a preferred embodiment of the present invention, provision is made for the brewing device to have a spacer which is provided to space apart the portion capsule from the first brewing chamber element at least in the loading position. Advantageously, the spacer prevents the portion capsule from tilting in the loading position or during transfer in the direction of the extraction position. The portion capsule is retained in position by the spacer until the brewing chamber has been closed. For this purpose, the spacer has in particular a free end that projects in a spring-elastic manner in the direction of the second brewing chamber element. The free end that projects in a spring-elastic manner serves to prevent a part of the portion capsule slipping in the direction of the first brewing chamber element, such that the portion capsule cannot tilt in the direction of the first brewing chamber. The spring-elastic configuration furthermore serves to reduce the position tolerance limits of the capsule. The spacer is configured in particular such that a lower region of the portion capsule cannot slip in the direction of the first brewing chamber element.

According to a preferred embodiment of the present invention, provision is made for the spacer to be formed integrally with a base plate fastened to the first brewing chamber element. It is thus comparatively easy to mount the spacer on the first brewing chamber element. In particular, the base plate has a mounting opening, for example for a fastening screw to pass through. The spacer is embodied in particular as a bending spring made from metal.

According to a preferred embodiment of the present invention, provision is made for the base plate to have at least one perforation spike that projects in the direction of the second brewing chamber element. Advantageously, the base plate serves both to retain the portion capsule in a constant orientation by means of the spacer, and also to perforate the portion capsule during the closing of the brewing chamber. Alternatively, provision is made for the brewing device to have a further base plate which has at least one perforation spike that projects in the direction of the second brewing chamber element, wherein the base plate is arranged preferably between the first brewing chamber element and the further base plate. Advantageously, in this way an arrangement of the perforation means and of the spacer that is as compact and stable as possible is achieved. Preferably, both the base plate and the further base plate each have a fastening opening, said fastening openings overlapping in the axial direction such that the base plate and the further base plate can be fastened to the first brewing chamber element using a common fastening screw. Preferably, the base plate or the further base plate has four perforation spikes that project in the direction of the second brewing chamber element, wherein two first perforation spikes are arranged in a common horizontal plane, and wherein two second perforation spikes are arranged in a common vertical plane, wherein the vertical plane extends preferably centrally between the two first perforation spikes. Advantageously, the two first perforation spikes are arranged above the second perforation spikes so that, during the introduction of the extraction liquid, the two first perforation spikes can first of all act as venting openings for the portion capsule.

According to a preferred embodiment of the present invention, provision is made for the base plate or the further base plate to have a feed opening for introducing extraction liquid into the brewing chamber, wherein the feed opening is arranged preferably in the vertical plane, and/or wherein the feed opening is arranged preferably between the two second perforation spikes, and/or wherein the feed opening comprises a half-side cutout formed in a peripheral region of the base plate or of the further base plate. Advantageously, in the extraction position, the extraction liquid is introduced into the brewing chamber through the feed opening. In this case, the extraction liquid passes into the interior of the portion capsule through openings in a cover of the portion capsule, said openings being produced by the perforation spikes during the closing of the brewing chamber.

According to a preferred embodiment of the present invention, provision is made for the first brewing chamber element to have a lower retaining means for retaining a lower peripheral region of the portion capsule, wherein the spacer is configured to space apart the portion capsule from the first brewing chamber element in the region of the retaining means, wherein preferably the free end is arranged on a side, facing the retaining means, of the base plate or of the further base plate. Advantageously, this prevents the lower peripheral region of the portion capsule from slipping on the retaining means in the direction of the first brewing chamber element and as a result causing the portion capsule to tilt. Alternatively, provision is made for the spacer to be configured in the form of a flute, corrugation and/or depression in the bearing surface of the retaining means, in order to prevent the capsule flange from slipping on the retaining means in the direction of the first brewing chamber element. It is also conceivable for the retaining means to be provided with a nonslip coating as spacer.

According to a preferred embodiment of the present invention, provision is made for the brewing device to comprise lateral retaining arms having retaining surfaces facing the first brewing chamber element, wherein the spacer is configured such that, in the loading position, the spacer presses the portion capsule in a spring-elastic manner against the retaining surfaces. In particular, a flange of the portion capsule is pressed against the retaining surfaces. On account of the asymmetrical configuration of the portion capsule, the portion capsule tends to tilt in the direction of the second brewing chamber element. The lower peripheral region then slips against the first brewing chamber element. The retaining surfaces and the spacer then ensure that, in the loading position and during transfer from the loading position into the extraction position, the portion capsule does not tilt in the direction of the second brewing chamber element, since the flange of the portion capsule rests against the retaining surfaces and the spacer prevents the lower region of the portion capsule from slipping in the direction of the first brewing chamber element. Preferably, the spacer is configured such that the spacer conforms to the first brewing chamber element in the extraction position, such that the extraction process and the leaktightness of the brewing chamber are not impaired in the extraction position by the spacer.

A further subject of the present invention is a method for operating a brewing device in particular according to the invention, wherein, in a first method step, a portion capsule is introduced between the first and the second brewing chamber element, and wherein, in a subsequent second method step, the first brewing chamber element is moved from the loading position into the extraction position, wherein the orientation of the portion capsule is kept constant during the second method step. Advantageously, in this way the portion capsule is prevented from striking peripheral regions of the second brewing chamber element during the closing of the brewing chamber. Preferably, the portion capsule is retained in a vertical orientation during the second method step, i.e. the main plane of extent of a cover of the portion capsule is oriented substantially parallel to the gravitational field or the vertical plane and preferably perpendicular to the axial direction.

According to a preferred embodiment of the present invention, provision is made for the portion capsule to be spaced apart from the first brewing chamber element by means of a spring-elastic spacer at the start of the second method step, and wherein the spacer is pressed by the portion capsule against the first brewing chamber element at the end of the second method step. Preferably, during the second method step, the first brewing chamber element is firstly moved linearly in an axial direction and subsequently additionally pivoted about a pivot axis perpendicular to the axial direction. The orientation of the portion capsule remains constant even during the pivoting of the first brewing chamber element. In this case, the spacer is pivoted in a spring-elastic manner against the first brewing chamber element, in order that the portion capsule does not tilt. Pivoting of the first brewing chamber element only shortly before the closing of the brewing chamber has the advantage that the perforation spikes do not already come into contact with the portion capsule in the loading position. This prevents the portion capsule from catching on the perforation spikes while it is being introduced.

The invention is explained in more detail in the following text with reference to exemplary embodiments illustrated in the drawings. The drawings illustrate merely exemplary embodiments of the invention which do not limit the essential concept of the invention.

EMBODIMENTS OF THE INVENTION

In the various figures, identical parts are always provided with the same reference signs and will therefore generally also be named or mentioned in each case only once.

Figure 1:
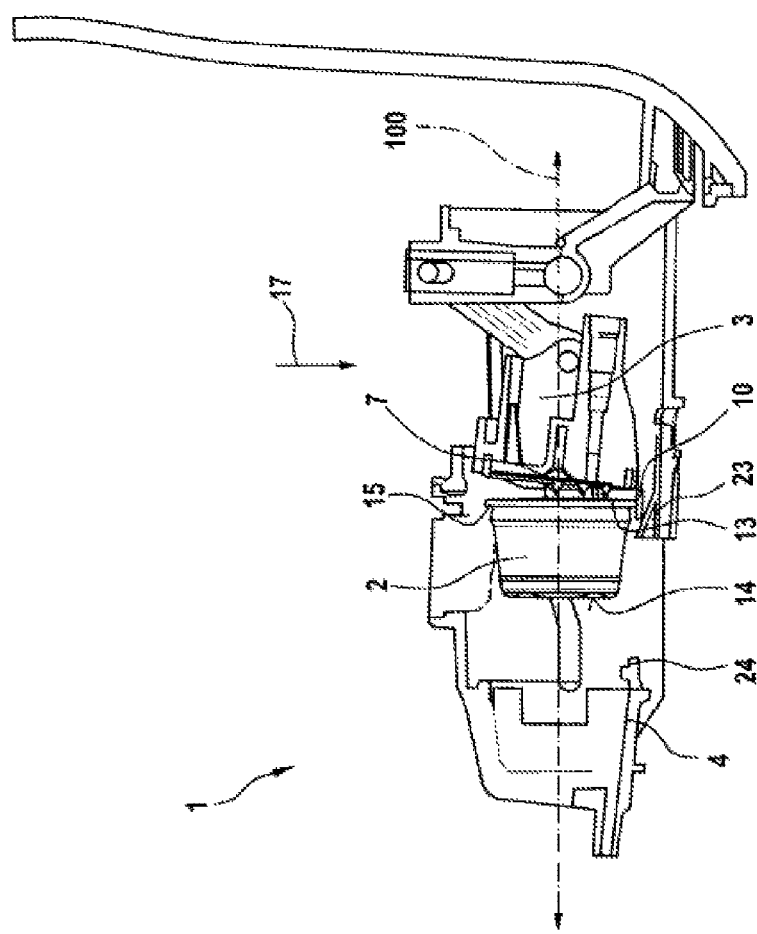
FIGS. 1 and 2 show schematic sectional views of a brewing device according to an exemplary embodiment of the present invention.
Figure 2:
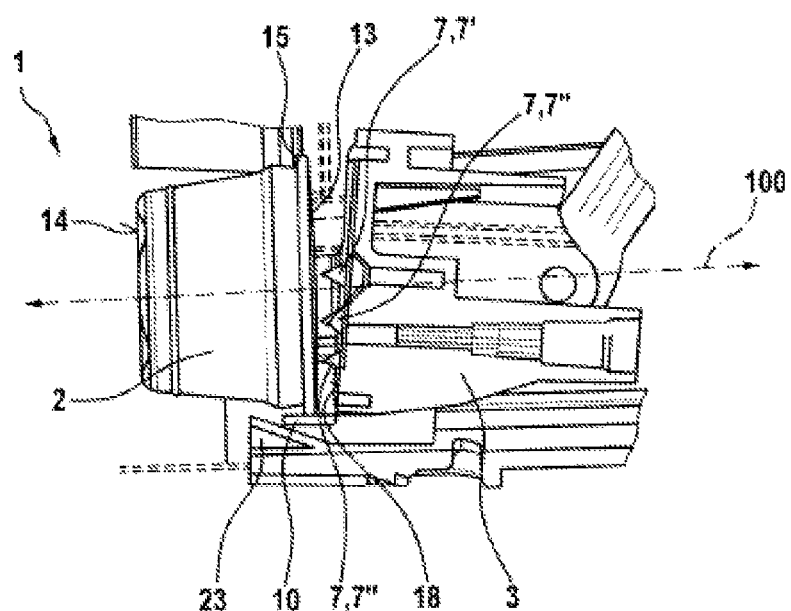
Figure 3:
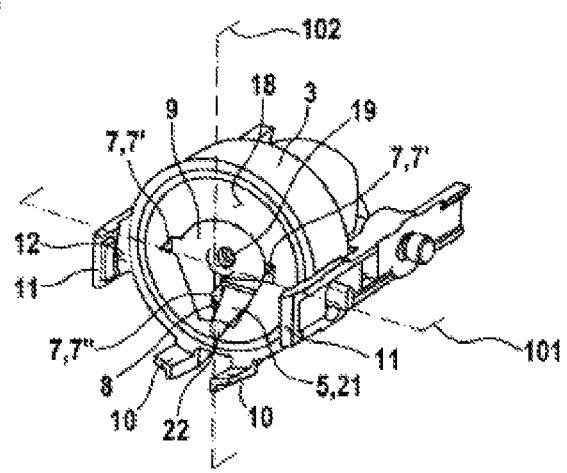
FIGS. 3, 4, 5, and 6 show schematic detail views of a first brewing chamber element of the brewing device according to the exemplary embodiment of the invention.
Figure 4:
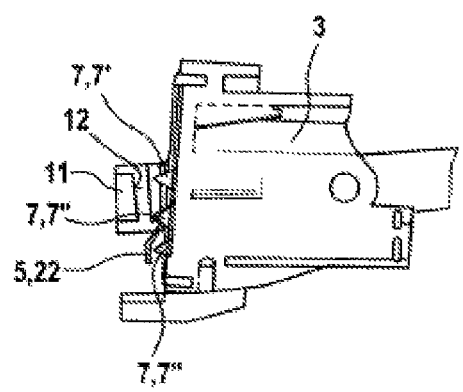

FIGS. 1 and 2 illustrate schematic sectional illustrations of a brewing device 1 for extracting from a portion capsule 2 in accordance with an exemplary embodiment of the present invention. The brewing device in this case comprises a second brewing chamber element 4 in the form of a receiving element or partially hollow bell element, and a first brewing chamber element 3 in the form of a closure element or plunger. The first brewing chamber element 3 is movable relative to the second brewing chamber element 4 in an axial direction 100 between a loading position, illustrated in FIG. 1, in which the portion capsule 2 can be introduced between the first and the second brewing chamber element 3, 4 in order to fill the brewing device 1, and an extraction position (not illustrated) in which the first and the second brewing chamber element 3, 4 have been moved together and a form a closed brewing chamber for extracting the beverage substances located in the portion capsule 2.

The portion capsule 2 comprises a truncated cone made from plastics material and formed in a pot-like manner. The truncated cone is closed in an airtight manner by means of a capsule cover 13 made from plastics material or aluminum foil. Located within the portion capsule 2 is a beverage substance, in particular a roasted coffee powder which can be extracted by means of an extraction liquid, or granules of an instant beverage or tea beverage. Optionally, the portion capsule 2 has a filter element (not depicted), which is spaced apart from a capsule bottom 14 of the portion capsule 2 and is arranged between the capsule bottom 14 and the beverage substance. The capsule cover 13 is adhesively bonded or welded to the truncated cone in the region of a capsule flange 15.

The first brewing chamber element 3 has a further base plate 9 on an end surface 18 facing the second brewing chamber element 4, said further base plate 9 comprising four perforation spikes 7. The four perforation spikes 7 project from the further base plate 9 in the direction of the second brewing chamber element 4. Two first perforation spikes 7' of the four perforation spikes 7 are arranged in a common horizontal plane 101, while two second perforation spikes 7" of the four perforation spikes 7 are arranged in a common vertical plane 102. The vertical plane 102 extends in particular parallel to the gravitational field of the Earth and centrally between the two first perforation spikes 7'. The two second perforation spikes 7" are arranged below the horizontal plane 101. The further base plate 9 has a half-side cutout as feed opening 8, this being arranged in the vertical plane 102 between the two second perforation spikes 7". The feed opening 8 is formed in the axial direction 100 in a manner congruent with a water outlet 16 formed on the first brewing chamber element 3, such that, in the extraction position, the extraction liquid, in particular hot water, can be introduced into the brewing chamber through the water outlet 16 and the feed opening 8. When the brewing chamber is closed, the capsule cover 13 is perforated by the perforation spikes 7 such that the introduced extraction liquid passes into the interior of the portion capsule 2 and interacts with the beverage substance.

The first brewing chamber element 3 furthermore has on its underside a lower retaining means 10 which is connected rigidly and in particular integrally to the first brewing chamber element 3 and on which the downwardly directed region of the capsule flange 15 rests in the loading position and while the first brewing chamber element 2 is being transferred from the loading position into the extraction position. In the extraction position, the retaining means 10 is arranged below the brewing chamber and below the second brewing chamber element 4. Furthermore, the first brewing chamber element 3 has two lateral retaining arms 11 of which the free ends face one another and each have a retaining surface 12 facing the first brewing chamber element 3. The retaining arms 11 are provided to laterally enclose the capsule flange 15 in the loading position and while the first brewing chamber element 3 is being transferred from the loading position into the extraction position, in order that the portion capsule 2 does not tilt in the direction of the second brewing chamber element 4.

The second brewing chamber element 4 has a second perforation means which comprises a piercing spike that points in the direction of the first brewing chamber element 3, said piercing spike being arranged within the cavity and preferably being connected releasably to the second brewing chamber element 4 via a latching connection. The piercing spike is provided with lateral grooves which extend parallel to the axial direction 100. Preferably, the capsule bottom 14 is perforated by the piercing spike while the brewing chamber is being closed or as a result of the pressure buildup in the interior of the portion capsule 2, such that the beverage produced in the extraction position by the interaction between the extraction liquid and the beverage substance can flow away to a beverage dispensing point.

In FIG. 1, the first brewing chamber element 3 is illustrated in the loading position, i.e. the first brewing chamber element 3 is spaced apart from the second brewing chamber element 4 in the axial direction 100. In this starting position, the portion capsule 2 is then introduced by a user (not depicted) into an intermediate region between the first and the second brewing chamber element 3, 4 in a vertical loading direction 17. To this end, a housing, configured as part of the second brewing chamber element 4, of the brewing device 1 has a feed opening through which the portion capsule 2 is introduced. The first brewing chamber element 3 is in this case tilted with respect to the second brewing chamber element 4 such that the end surface 8 is inclined with respect to the loading direction 17. As a result of this inclination, that region of the first brewing chamber element 3 that faces the feed opening is furthest away from the second brewing chamber element 4, such that the portion capsule 2 is introducible into the intermediate region without there being a risk of the portion capsule 2 catching on the perforation spikes 7.

Figure 5:
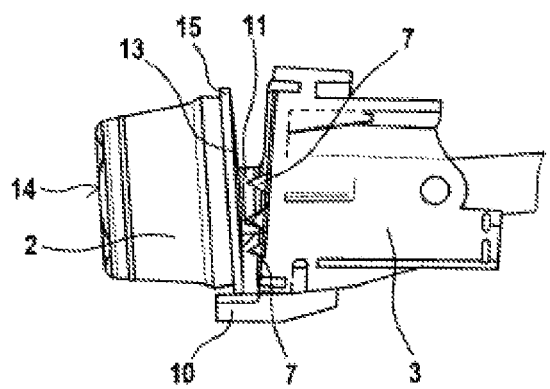
Figure 6:
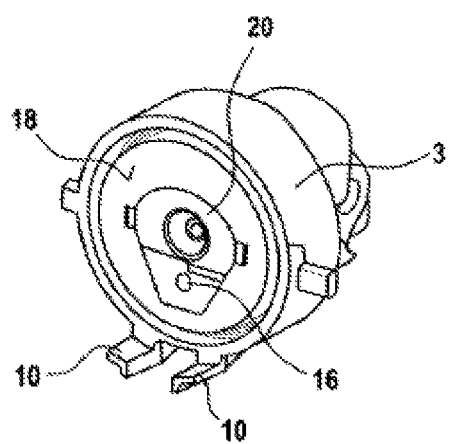
Figure 7:
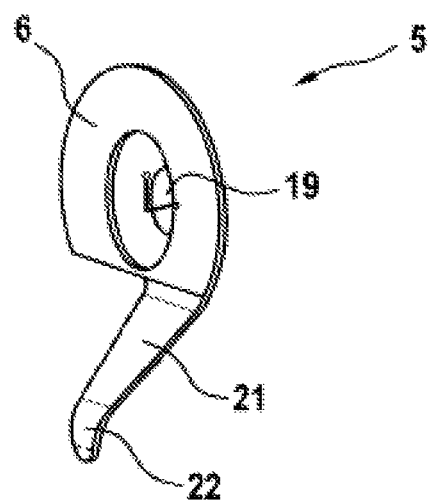
FIG. 7 shows a schematic detail view of a spacer of the brewing device according to the exemplary embodiment of the invention.

FIGS. 2 and 5 clearly illustrate that the portion capsule 2 drops laterally under the effect of gravitational force into the region between the first and the second brewing chamber element 3, 4 and rests on the retaining means 10 there. At the same time, tilting of the portion capsule 2 in the direction of the second brewing chamber element 4 is prevented by the lateral retaining arms 11, in that the capsule flange 15 is supported on the retaining surfaces 12 in the direction of the second brewing chamber element 4, such that the portion capsule 2 is oriented substantially axially in the axial direction 100. The capsule cover 13 and the capsule bottom 14 are consequently oriented substantially parallel to the loading direction 17 or to the gravitational field and perpendicularly to the axial direction 100. As a result of the high degree of asymmetry of the portion capsule (the greatest weight of the portion capsule 2 is directed in a free-hanging manner in the direction of the second brewing chamber element 4) a torque acts on the portion capsule 2. This torque can result in the lower region of the portion capsule 2, or of the capsule flange 15, slipping on the retaining means 10 in the direction of the first brewing chamber element 10. The portion capsule 2 would then tilt in the direction of the second brewing chamber element 4 in spite of the fixing of the flange in the upper region of the portion capsule 2 by the lateral retaining arms 11. If a user were subsequently to attempt to close the brewing chamber, the portion capsule 2 would possibly butt with its capsule bottom 14 against a lower peripheral region 24 of the second brewing chamber elements 4 and thus block closing of the brewing chamber. In order that the lower region of the portion capsule 2 does not slip in the direction of the first brewing chamber element 3, the brewing device 1 has a spacer 5 which spaces apart the lower region of the portion capsule 2 from the first brewing chamber element 3. As a result, the portion capsule 2 remains in an orientation oriented axially in the axial direction 100. The orientation of the portion capsule 2 remains constant both in the loading position and when the first brewing chamber element 3 is being transferred from the loading position into the extraction position. The portion capsule 2 remains oriented in particular axially in the axial direction 100 such that risk-free introduction of the portion capsule 2 into the cavity can always be ensured during the closing of the brewing chamber.

In the present example, the spacer 5—as is illustrated in FIGS. 3, 4, 5 and 7—comprises a metal bending spring 21 which is fixed to the first brewing chamber element 3 via a base plate 6 and has a free end 22 that projects in the direction of the second brewing chamber element 4 in the lower region of the portion capsule 2, it being possible for said free end 22, in the extraction position, to be moved in a spring-elastic manner against the end surface 18 of the first brewing chamber element 3. The free end 22 presses the lower region of the portion capsule 2 in the direction of the second brewing chamber element 4, such that slipping in the direction of the first brewing chamber element 3 is prevented. The base plate 6 is arranged preferably between the further base plate 9 and the first brewing chamber element 3, wherein the base plate 6 and the further base plate 9 have mutually aligned fastening openings 19 through which a common fastening screw for fastening the base plate 6 and the further base plate 9 to the first brewing chamber element 3 can be passed. A depression 20 in the form of the external contour of the base plate 6 and of the further base plate 9 is preferably introduced into the end surface 18, such that the further base plate 9 and the base plate 6 are inserted into the depression and the further base plate 9 terminates flush with the rest of the end surface 18.

Alternatively, provision is made for the spacer 5 to be configured in the form of a flute, corrugation and/or depression in the upwardly directed bearing surface of the retaining means 10 for the capsule flange 15, in order to prevent the capsule flange 15 from slipping on the retaining means 10 in the direction of the first brewing chamber element 3. It is also conceivable for the retaining means 10 to be provided with a nonslip coating as spacer 5.

As a result of the inclination of the first brewing chamber element 3, contact between the perforation spikes 7 and the capsule cover 13 is furthermore largely avoided in the loading position. The retaining means 10 optionally has on its free outer end an edge which prevents undesired slipping of the capsule flange 15 from the retaining means 10, i.e. in the direction of the second brewing chamber element 4.

While the brewing chamber is being closed, the portion capsule 2 remains in the axial orientation, wherein the first brewing chamber element 3 is likewise pivoted into an axial orientation at the end of the closing movement. However, in this case, the capsule flange 15 is already resting all around against the peripheral region 24 of the second brewing chamber element 4, with the result that the axial orientation of the portion capsule 2 is not changed. The spacer 5 conforms in a spring-elastic manner merely to the first brewing chamber element 3 and the brewing chamber is hermetically sealed in order to initiate the extraction operation. Following completion of the extraction operation, the first brewing chamber element 3 is moved back into the loading position shown in FIG. 1, wherein the used portion capsule 2 is pushed from the retaining means 10 by means of an ejector 23 during the return movement of the first brewing chamber element 3, and drops down.

LIST OF REFERENCE SIGNS

1 Brewing device
2 Portion capsule
3 First brewing chamber element
4 Second brewing chamber element
5 Spacer
6 Base plate
7 Perforation spikes
8 Feed opening
9 Further base plate
10 Retaining means
11 Retaining arms
12 Retaining surface
13 Capsule cover
14 Capsule bottom
15 Capsule flange
16 Water outlet
17 Loading direction
18 End surface
19 Fastening opening
20 Depression
21 Bending spring
22 Free end
23 Ejector
24 Peripheral region
100 Axial direction
101 Horizontal plane
102 Vertical plane

The invention claimed is:

1. A brewing device for extracting from a portion capsule, having a brewing chamber closure element and a brewing chamber receiving element, wherein the brewing chamber closure element is movable between a loading position, in which the brewing chamber closure element and the brewing chamber receiving element are spaced apart from one another in order to introduce the portion capsule, and an extraction position, in which the brewing chamber closure element and the brewing chamber receiving element have been moved together in order to form a substantially closed brewing chamber for the portion capsule, the brewing device is configured such that the orientation of the portion capsule remains substantially constant during transfer from the loading position into the extraction position, wherein the brewing device has a spacer which is provided to space apart the portion capsule from the brewing chamber closure element at least in the loading position, wherein the spacer has a free end that projects in a spring-elastic manner in the direction of the brewing chamber receiving element, wherein the brewing chamber closure element has a lower retaining means for retaining a lower peripheral region of the portion capsule, and wherein the spacer is configured to space apart the portion capsule from the brewing chamber closure element in the region of the retaining means, wherein the spacer is formed integrally with a base plate fastened to the brewing chamber closure element, and wherein the brewing device has a further base plate which has at least one perforation spike that projects in the direction of the brewing chamber receiving element.

2. The brewing device as claimed in claim 1, wherein the base plate or the further base plate has four perforation spikes that project in the direction of the brewing chamber receiving element, wherein two first perforation spikes are arranged in a common horizontal plane, and wherein two second perforation spikes are arranged in a common vertical plane, wherein the vertical plane extends centrally between the two first perforation spikes.

3. The brewing device as claimed in claim 1, wherein the base plate or the further base plate has a feed opening for introducing extraction liquid into the brewing chamber, wherein the feed opening is arranged in the vertical plane, and/or wherein the feed opening is arranged preferably between the two second perforation spikes, and/or wherein the feed opening comprises a half-side cutout formed in a peripheral region of the base plate or of the further base plate.

4. The brewing device as claimed in claim 1, wherein the free end is arranged on a side, facing the retaining means, of the base plate or of the further base plate.

5. The brewing device as claimed in claim 1, wherein the brewing device comprises lateral retaining arms having retaining surfaces facing the brewing chamber closure element, wherein the spacer is configured such that, in the loading position, the spacer presses the portion capsule in a spring-elastic manner against the retaining surfaces.

6. The brewing device as claimed in claim 1, wherein the spacer is configured such that the spacer conforms to the brewing chamber closure element in the extraction position.

7. A method for operating a brewing device as recited in claim 1, wherein, in a first method step, a portion capsule is introduced between the brewing chamber closure element and the brewing chamber receiving element, and wherein, in a subsequent second method step, the brewing chamber closure element is moved from the loading position into the extraction position, characterized in that the orientation of the portion capsule is kept constant during the second method step, wherein the portion capsule is retained in a vertical orientation during the second method step, wherein, during the second method step, the brewing chamber closure element is firstly moved linearly in an axial direction and subsequently additionally pivoted about a pivot axis perpendicular to the axial direction, wherein the portion capsule is spaced apart from the brewing chamber closure element by means of a spring-elastic spacer at the start of the second method step, and wherein the spacer is pressed by the portion capsule against the brewing chamber closure element at the end of the second method step.

8. A brewing device for extracting from a portion capsule, having a first brewing chamber element and a second brewing chamber element, wherein the first brewing chamber element is movable between a loading position, in which the first and the second brewing chamber element are spaced apart from one another in order to introduce the portion capsule, and an extraction position, in which the first and the second brewing chamber element have been moved together in order to form a substantially closed brewing chamber for the portion capsule, the brewing device is configured such that the orientation of the portion capsule remains substantially constant during transfer from the loading position into the extraction position, wherein the brewing device has a spacer which is provided to space apart the portion capsule from the first brewing chamber element at least in the loading position, wherein the spacer has a free end that projects in a spring-elastic manner in the direction of the second brewing chamber element, wherein the first brewing chamber element has a lower retaining means for retaining a lower peripheral region of the portion capsule, and wherein the spacer is configured to space apart the portion capsule from the first brewing chamber element in the region of the retaining means, wherein the spacer is formed integrally with a base plate fastened to the first brewing chamber element, and wherein the brewing device has a further base plate which has at least one perforation spike that projects in the direction of the second brewing chamber element, wherein the free end is arranged on a side, facing the retaining means, of the base plate or of the further base plate.

* * * * *